Feb. 16, 1971 L. P. BRUDEVOLD 3,564,430

LINEAR RECTIFIER WITH POLARITY DETECTOR

Filed Oct. 30, 1968

INVENTOR.
LEIF P. BRUDEVOLD
BY Donald W. Phillion
ATTORNEY

United States Patent Office 3,564,430

Patented Feb. 16, 1971

3,564,430

LINEAR RECTIFIER WITH POLARITY DETECTOR

Leif P. Brudevold, Orange, Calif., assignor to Collins Radio Company, Dallas, Tex., a corporation of Iowa Filed Oct. 30, 1968, Ser. No. 771,956
Int. Cl. H03k *5/20*
U.S. Cl. 328—140 4 Claims

ABSTRACT OF THE DISCLOSURE

A linear rectifier with an input signal polarity indicator and comprising a differential amplifier with first and second feedback means extending from the output terminal thereof back to the input terminal thereof. The first feedback means is conductive only in response to a first polarity of the input signal to cause generation of a portion of the output signal, and the second feedback means is conductive only in response to the second polarity of the input signal to cause generation of the remainder of the output signal. The second feedback means comprises means which becomes conductive or nonconductive in accordance with the polarity of the input signal, thereby indicating the input signal polarity as well as controlling the state of conductivity of the feedback circuit.

This invention relates generally to linear rectifiers and, more particularly, to a linear rectifier with polarity detection an inherent characteristic thereof.

In the prior art there are several ways to effect analog-to-digital conversion. One of these methods is to convert the entire analog signal to one polarity as, for example, the positive polarity, and then to sample the positive analog signal at regular time intervals, denoting the amplitude of the sampling by a binary coded signal. With this system, however, there is required some means of identifying the actual polarity of each sampling. In prior devices, such identification of polarity has been attained by means of a circuit separate from the circuit which converts the analog signal to a signal of one polarity.

At primary object of the present invention is a simplified rectifying circuit which contains means for indicating the polarity of the applied input signal.

As second object of the invention is an inexpensive and reliable rectifying circuit which can be employed in an analog-to-digital converter and which has inherent therein the capability of continuous identification of the polarity of the applied signal.

A third purpose of the invention is the improvement of rectifier circuits, generally.

Before giving a general statement of the invention, a brief statement of the relevant prior art will be given in order to enable the reader to more fully understand the invention. In the prior art there is provided a differential amplifier having a first input means to which is applied the input signal through a dropping resistor $R_1$. The other input of the differential amplifier is connected to a constant reference voltage such as ground. At the output of the differential amplifier, a first and a second circuit, arranged substantially in parallel, are connected back to the input of the differential amplifier. The first of these circuits includes a voltage divider having resistances $R_2$ and $R_3$ connected across said dropping resistor $R_1$ with the tap therein connected to the differential amplifier output through a diode. The second circuit is a series arrangement of a second diode and an impedance which connect the output of the differential amplifier to the input thereof. The two diodes are connected to present opposite impedances to the output of the differential amplifier so that one will become conductive and the other nonconductive, or vice versa, in response to input signals of different polarities supplied to the differential amplifier. Thus, for example, when a positive signal is supplied to the differential amplifier, the output thereof is negative so that said first diode is nonconductive and said second diode is conductive. Since the first diode is nonconductive, the output voltage, which is taken from the voltage divider tap, is determined simply by the ratio of the resistors $R_3$ and $R_2$ which form a voltage divider across the input dropping resistor $R_1$. Such output voltage is positive, as is the input voltage.

On the other hand, when a negative input voltage is supplied to the differential amplifier, the output thereof is positive, so that said first diode is conductive and the second diode nonconducive. Under such conditions, the output voltage at said voltage divider tap is positive and is determined by the ratio of resistor $R_3$ over the dropping resistor $R_1$. Resistor $R_3$ is that resistor joining the tap to the input terminal of the differential amplifier. More specifically, the resistors $R_3$ and $R_1$ form a series circuit between the tap and the applied input voltage with the first input terminal of the differential amplifier being at or near ground potential by definition of the operation of a differential amplifier.

In accordance with the present invention there is substituted for the second circuit means, another circuit means which connects the input of the differential amplifier to a second reference voltage. Said other circuit means comprising an impedance in series with the emitter-collector circuit of a transistor, with the base of said transistor being connected to the output of the differential amplifier. When the input of the differential amplifier is positive and the output negative, said transistor becomes conductive so that the input of the amplifier can be returned to ground potential from said second reference voltage through said transistor and said impedance means. It is to be noted that the output of the differential amplifier is determined by the current through the series impedance means and said transistor since said current also flows through the input dropping resistor $R_1$.

When a negative input voltage is supplied to the differential amplifier, the output thereof will be positive and said transistor will be cut off so that the operation of the amplifier involves said first circuit means as described above in connection with the prior art device.

Thus it can be seen that the substituted second circuit means functions not only to operate the differential amplifier during the application of positive input voltages to the said differential amplifier, but also functions to operate as a switch in that it is turned on or off in accordance with the polarity of the applied signal. Such operation of the transistor is detected by an appropriate switching circuit which can comprise a second transistor to provide a two-level output voltage in which said levels indicate the polarity of the input signal to the differential amplifier.

The above-mentioned and other objects and features of the invention will be more fully understood from the following detailed description thereof when read in conjunction with the drawings in which.

Figure 1:
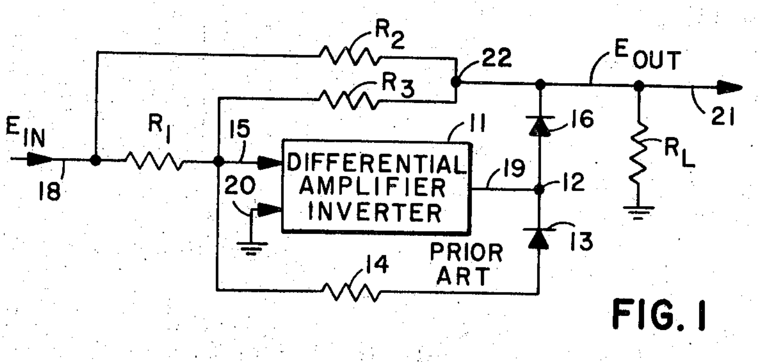
FIG. 1 is a schematic diagram of prior art.

To provide a better understanding of the invention shown in FIG. 3, the prior art circuit of FIG. 1 will be described briefly first. Assume that a positive half cycle of $E_{in}$, as shown in the time interval $T_1$ of FIG. 2, is supplied to input terminal 18 of FIG. 1 and then through dropping resistor $R_1$ to input terminal 15 of differential amplifier 11. The differential amplifier 11 functions to produce at its output terminal 19 an inverted form of the signal supplied to its input terminal 15. The other input terminal 20 of the differential amplifier is connected to some fixed reference potential, such as ground.

Thus, when a positive signal is supplied to input terminal 15, there is produced at output terminal 19 a negative voltage which functions to cut off diode 16 and to make conductive the diode 13. Opening of diode 13 provides a path back to input terminal 15 through diode 13 and resistor 14. In accordance with the operation of differential amplifiers in general, the output of the amplifier will increase until the voltage drop across the series arrangement of diode 13 and resistor 14 is equal to the voltage gain across the amplifier 11 so that the potential of input terminal 15 is just a little bit positive with respect to ground.

It is to be noted that when the potential of junction 12 is negative as discussed above, diode 16 is cut off. The voltage on output terminal 21 is then determined by the potential of tap 22 of the voltage divider consisting of resistors $R_2$ and $R_3$. The voltage across said voltage divider is equal to the voltage drop across resistance $R_1$. Expressed in terms of the circuit parameters, the voltage at tap 22, which is the output voltage, is equal to:

$$E_{out}=E_{in}\left(\frac{R_3}{R_2+R_3}\right)$$

assuming $R_L \gg R_3$.

Such a voltage is positive and is represented by the waveform $E_{out}$ of FIG. 2 during time interval $T_1$.

Assume now that the polarity of the input voltage reverses and becomes negative. Such a condition is illustrated generally in waveform $E_{in}$ of FIG. 2 during time interval $T_2$. Such a negative voltage is supplied through dropping resistor $R_1$ to input terminal 15 of amplifier 11 which responds thereto to produce a positive voltage on its output terminal 19. Such positive output voltage functions to cut off diode 13 and to open, i.e., make conductive, the diode 16.

The cutting off of diode 13 completely removes said diode 13 and the associated resistor 14 from the circuit during this part of the operation.

Opening of diode 16 provides a path through resistor $R_3$ back to input terminal 15 of the differential amplifier, to cause the potential of said input 15 to return to a value just slightly positive with respect to ground potential, in accordance with the general operation of differential amplifiers.

The potential at point 22, which is the output voltage of the system, can then be expressed in the following manner.

$$E_{out}=E_{in}\left(\frac{R_3}{R_1}\right)$$

The above expression can be better understood when it is realized that the current passing through $R_1$ is substantially equal to the current passing through $R_3$. Then since the voltage across $R_1$ is equal to $E_{in}$ (since input 15 is substantially at ground potential) the voltage across $R_3$ bears a direct relationship to the voltage across $R_1$ as shown in the above expression.

The voltage appearing at output 21 is positive in nature and is represented generally by the waveform $E_{out}$ of FIG. 2 during time interval $T_2$.

Figure 2:
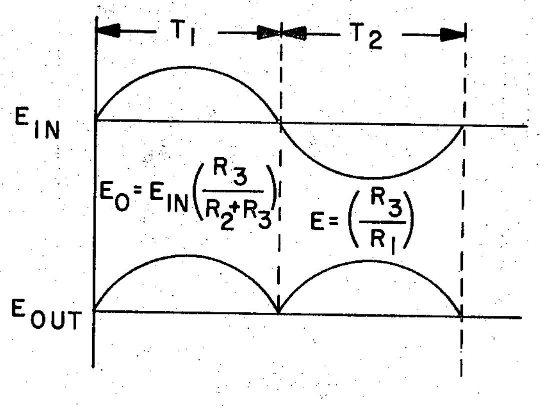
FIG. 2 is a set of waveforms showing the relation between input and output signals and which is applicable to the circuits of both FIG. 1 and FIG. 3.

It can be seen from the above brief description of FIG. 1 that the circuit of FIG. 1 functions essentially as a linear rectifier. There is no means for determining the polarity of $E_{in}$ from the output voltage.

Figure 3:
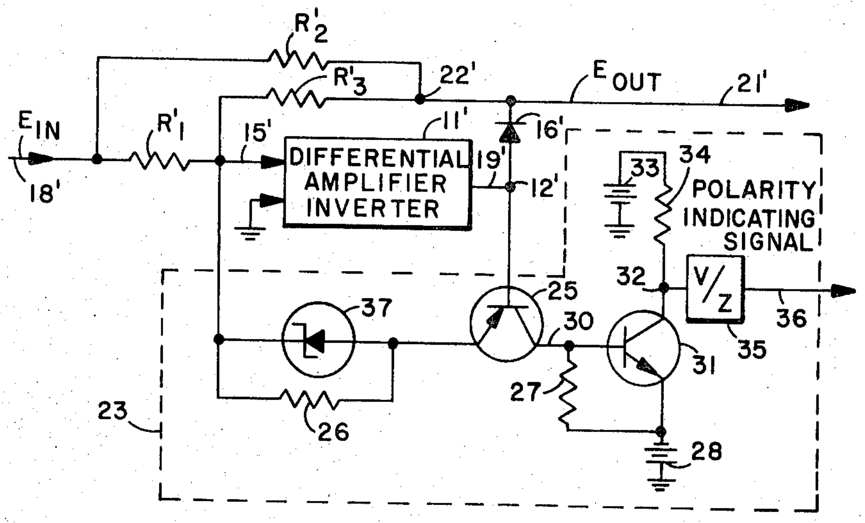
FIG. 3 is a schematic diagram of the invention.

In FIG. 3, there is shown a circuit which will not only function to provide the linear rectification of FIG. 1, but will also function to produce a polarity indicating output. More specifically, the circuit of FIG. 3 differs from the prior art in that diode 13 and resistor 14 of FIG. 1 have been replaced by the circuit within the block 23 of FIG. 3.

The circuit of FIG. 3 operates in the following manner. When the polarity of the input signal is positive as shown in time interval $T_1$ of FIG. 2, the output voltage of differential amplifier 11' is negative and functions to cut off diode 16', and also to energize transistor 25. Energization of transistor 25 creates a circuit path extending from input terminal 15' of differential amplifier 11, through resistor 26, transistor 25, resistor 27, to the negative terminal of battery source 28. The base electrode of transistor 25 is connected directly to the output of differential amplifier 11'.

The circuit stabilizes when the voltage drop across the base-emitter electrodes of transistor 25 plus the voltage drop across resistor 26 is equal to the difference between the voltages appearing at the input terminal 15' of differential amplifier 11' and the output terminal 19' thereof, with the potential of input terminal 15' being just slightly positive with respect to ground. It can be seen that as long as there is any substantial positive potential on input terminal 15', there will be a substantially negative potential on output 19' so that there will be an increasing current flow through resistor 26, transistor 25 and resistor 27 to battery source 28. Such current will increase until the voltage drop across the resistor 26 is great enough to bring the potential of input terminal 15' to a value slightly positive with respect to ground.

The operation of the circuit of FIG. 3 can also be viewed in the following manner. There is a current flow from the input terminal 18' though resistor $R_1'$ and then through three paths in parallel. The first of these paths is $R_3'$ to output terminal 21'. The second path is into the differential 11' and internally to ground and also to output terminal 19'. The third parallel path is through resistor 26, transistor 25, and resistor 27 to negative battery 28. The three current paths conduct portions of the current until Ohm's Law is satisfied and the input terminal 15' of differential amplifier 11' is just about ground potential. Generally speaking, the larger the value of resistor 26 the greater gain of differential amplifier 11' since the portion of current that must pass through amplifier 11' is increased thereby.

A switching circuit to produce a two-level polarity indicating output signal on output lead 36 comprises the transistor 31 whose state of conductivity is responsive to that of transistor 25. The operation of switching transistor 31 is as follows. When transistor 25 becomes energized as discussed above, the potential at collector electrode 30 becomes positive, thus causing transistor 31 to be conductive and decreasing the potential of collector electrode 32 thereof to its lower level.

When the input voltage $E_{in}$ is negative during time interval $T_2$ in FIG. 2, the output of differential amplifier 11' is positive and transistor 25 is cut off. In its cut-off condition the collector electrode thereof goes negative which in turn cuts off transistor 31. The cutting off of transistor 31 causes the potential of its collector electrode 32 to become positive (its upper level) since there is no current flow from positive battery 33 through collector load resistor 34. This positive voltage level is indicative of an input signal of negative polarity.

The signals appearing at collector electrode 32 are supplied through an appropriate voltage impedance matching circuit 35 and then to output terminal 36, which in turn supplies the output signal to suitable utilization means.

In order to make transistor 25 function effectively, it must become energized very shortly after $E_{in}$ becomes positive. More specifically, the sooner transistor 25 becomes conductive after $E_{in}$ goes positive, the more accurate will be the operation of the circuit. The obtaining of such rapid energization of transistor 25 requires a large gain in amplifier 30 which in turn requires a large resistor 26. Ther large resistor 26 functions to produce a large voltage thereacross with a relatively small current therethrough. However, there is a possible disadvantage in making $R_{26}$ too large. More specifically, the amplifier 11' is apt to become saturated due to the greater amount of current diverted therethrough. Saturation of amplifier 11' could result in damage thereto and in some cases to an undesirable increased recovery time. To avoid such porblems, impedance 37 is placed in parallel with resistor 26. Said impedance 37 can be a Zener type diode device which is responsive to a certain potential appearing across $R_{26}$ to become conductive, thereby lowering the effective resistance of $R_{26}$, and also the gain in the amplifier loop.

I claim:

1. Rectifier means with input signal polarity indicating means comprising:

differential amplifier means having first input means connected to a reference potential, second input means, and an output means, and constructed to produce an output signal having a given polarity with respect to the polarity of said input signal;

first feedback means comprising the series arrangement of first impedance means and asymmetrical means connecting said output means to said second input means and constructed to be conductive when said output signal of said differential amplifier is of a first polarity and to be nonconductive when said output signal is of a second polarity; and second feedback means comprising the series arrangement of polarity indicating switching means and second impedance means and constructed to connect said differential amplifier output means to said second input means;

said polarity indicating switching means comprising electron valve means constructed to respond to said differential amplifier output signal of said first polarity to become nonconductive and to said differential amplifier output signal of said second polarity to become conductive.

2. Rectifier means with input signal polarity indicating means comprising:

differential amplifier means having first input means connected to a reference potential, second input means and an output means, and constructed to have an output signal of a polarity in accordance with the polarity of said input signal;

said second input means comprising first, second and third impedance means with said first and second impedance means connected in series with a tap therebetween and connected in parallel with said third impedance means;

asymmetrical means connecting the output means of said differential amplifier to said tap and constructed to be conductive in response to an output signal of said differential amplifier of a first polarity; and feedback means comprising the series arrangement of polarity indicating switching means and fourth impedance means and constructed to connect said differential amplifier output means to said second input means;

said polarity indicating switching means comprising electron valve means constructed to respond to said differential amplifier output singal of said first polarity to become nonconductive and to said differential amplifier output signal of said second polarity to become conductive.

3. Rectifier means with input signal polarity indicating means comprising:

differential amplifier means having first input means connected to a reference potential, second input means, and an output means, and constructed to produce an output signal of a polarity in accordance with the polarity of said input signal;

said second input means comprising first, second, and third impedance means with said first and second impedance means connected in series with a tap therebetween and connected in parallel with said third impedance means;

asymmetrical means connecting the output means of said differential amplifier to said tap and constructed to be conductive in response to an output signal of a first polarity;

polarity indicating switching means connecting said differential amplifier output means to said second input means and comprising the series arrangement of a fourth impedance means and an electron valve means;

said electron valve means having an electron control electrode, an electron emitting electrode, and an electron collecting electrode; and means for connecting said electron control electrode to said output means of said differential amplifier means;

said electron valve means responsive to the output signal of said differential amplifier to become conductive when said output signal is of said second polarity and to become nonconductive when said output signal is of said first polarity.

4. A rectifier means for rectifying an input signal and having polarity indicating means and comprising:

differential amplifier means comprising first input means connected to a reference potential, second input means, and output means;

first impedance means for supplying said input signal to said second input means;

first feedback circuit means connecting the output means of said differential amplifier to the said second input means thereof and comprising:

voltage divider means comprised of second and third impedance means with a tap therebetween and connected across said first impedance means; and diode means connecting said tap to said output means of said differential amplifier;

second feedback circuit means connecting the output means of said differential amplifier back to said second input means thereof and comprising:

electron valve means constructed to have two levels of conductivity in response to the polarity of the output of said differential amplifier and having an electron emitting electrode, an electron collecting electrode, and an electron control electrode;

fourth impedance means connecting one terminal of the electron emitting electrode-electron collecting electrode circuit to said second input means of said differential amplifier means;

means connecting said electron control electrode to said output means of said differential amplifier;

and indicator load means connected to said electron collector electrode.

References Cited

UNITED STATES PATENTS

| | | | |
|---|---|---|---|
| 2,957,137 | 10/1960 | Robinson, Jr. | 307—236X |
| 3,076,901 | 2/1963 | Rubin et al. | 324—133X |
| 3,188,526 | 6/1965 | Engel | 307—236X |
| 3,292,098 | 12/1966 | Bensing | 307—262X |

STANLEY T. KRAWCZEWICZ, Primary Examiner

U.S. Cl. X.R.

307—229, 236, 261, 262; 324—133; 328—26, 32; 340—253